(12) United States Patent
Xu et al.

(10) Patent No.: US 12,391,866 B2
(45) Date of Patent: Aug. 19, 2025

(54) SURFACTANT MIXTURES FOR ENHANCED OIL RECOVERY

(71) Applicant: Saudi Arabian Oil Company, Dhahran (SA)

(72) Inventors: Limin Xu, Beijing (CN); Ming Han, Dhahran (SA); Tianping Huang, Beijing (CN)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/350,469

(22) Filed: Jul. 11, 2023

(65) Prior Publication Data

US 2025/0019586 A1 Jan. 16, 2025

(51) Int. Cl.
*C09K 8/584* (2006.01)

(52) U.S. Cl.
CPC ................... *C09K 8/584* (2013.01)

(58) Field of Classification Search
CPC .......... C09K 8/58; C09K 8/584; C09K 8/588; C09K 2208/06
See application file for complete search history.

(56) References Cited

U.S. PATENT DOCUMENTS

| | | | |
|---|---|---|---|
| 4,799,547 A * | 1/1989 | Borchardt | E21B 43/164 166/275 |
| 5,441,541 A | 8/1995 | Mehreteab et al. | |
| 5,979,557 A | 11/1999 | Card et al. | |
| 6,306,800 B1 | 10/2001 | Samuel et al. | |
| 6,410,489 B1 | 6/2002 | Zhang et al. | |
| 6,637,517 B2 | 10/2003 | Samuel et al. | |
| 7,008,908 B2 | 3/2006 | Chan et al. | |
| 7,237,608 B2 | 7/2007 | Fu et al. | |
| 7,458,424 B2 | 12/2008 | Odeh et al. | |
| 7,533,723 B2 | 5/2009 | Hughes et al. | |
| 7,621,334 B2 | 11/2009 | Welton et al. | |
| 7,858,563 B2 | 12/2010 | Hughes et al. | |
| 7,875,575 B2 | 1/2011 | Huang et al. | |
| 7,989,404 B2 | 8/2011 | Kakadjian et al. | |
| 8,053,397 B2 | 11/2011 | Huang et al. | |
| 9,670,397 B2 | 6/2017 | Ghumare et al. | |
| 9,828,815 B2 | 11/2017 | Silveira et al. | |
| 10,266,748 B2 | 4/2019 | Kalgaonkar et al. | |

(Continued)

FOREIGN PATENT DOCUMENTS

| | | |
|---|---|---|
| CA | 2959311 | 9/2019 |
| CN | 103540303 | 1/2014 |

(Continued)

OTHER PUBLICATIONS

Translation of CN 103540305 (Year: 2014).*

(Continued)

*Primary Examiner* — Angela M DiTrani Leff
(74) *Attorney, Agent, or Firm* — Fish & Richardson P.C.

(57) ABSTRACT

A system and a method for making and using an enhanced oil recovery (EOR) fluid. The EOR fluid includes a base fluid, an anionic-nonionic surfactant including one of sodium alkylphenol ethoxylate carboxylate (APEC), sodium alkyl ethoxylate carboxylate (AEC), sodium alkylphenol ethoxylate sulfate (APES), or sodium alkyl ethoxylate sulfate (AES), and a second surfactant including a cationic surfactant including an alkyl pyridine salt.

21 Claims, 4 Drawing Sheets

(56) References Cited

U.S. PATENT DOCUMENTS

| | | |
|---|---|---|
| 10,351,755 B2 | 7/2019 | Wagle et al. |
| 10,407,609 B2 | 9/2019 | Kalgaonkar et al. |
| 10,494,565 B2 | 12/2019 | Wylde et al. |
| 10,995,261 B2 | 5/2021 | Holtsclaw et al. |
| 11,203,712 B1 | 12/2021 | Kalgaonkar et al. |
| 11,254,855 B2 | 2/2022 | Xu et al. |
| 11,685,855 B2 | 6/2023 | Kalgaonkar et al. |
| 2008/0311060 A1 | 12/2008 | Sakuta et al. |
| 2011/0071056 A1 | 3/2011 | Saini et al. |
| 2012/0085534 A1 | 4/2012 | Morvan |
| 2013/0261033 A1 | 10/2013 | Nguyen |
| 2015/0267104 A1 | 9/2015 | Puerto et al. |
| 2016/0024370 A1 | 1/2016 | Ba geri |
| 2016/0024891 A1 | 1/2016 | Fursdon-Welsh et al. |
| 2019/0256458 A1 | 8/2019 | Hussain et al. |
| 2019/0284467 A1 | 9/2019 | Forbes et al. |
| 2021/0147744 A1* | 5/2021 | Xu ............................ E21B 43/16 |
| 2021/0332307 A1 | 10/2021 | Huff et al. |
| 2021/0380867 A1 | 12/2021 | Kalgaonkar et al. |
| 2021/0380871 A1 | 12/2021 | Kalgaonkar et al. |
| 2022/0298408 A1 | 9/2022 | Nguyen et al. |
| 2023/0265334 A1 | 8/2023 | Kalgaonkar et al. |
| 2024/0294822 A1 | 9/2024 | Xu et al. |
| 2024/0294823 A1 | 9/2024 | Qi et al. |

FOREIGN PATENT DOCUMENTS

| | | | |
|---|---|---|---|
| CN | 103540305 A * | 1/2014 | ............ C09K 8/584 |
| CN | 201210239959 | 1/2014 | |
| CN | 103773347 | 2/2016 | |
| CN | 103540304 | 2/2017 | |
| CN | 104232045 | 2/2017 | |
| CN | 106590592 | 11/2019 | |
| CN | 114196388 A * | 3/2022 | |
| CN | 111088016 | 4/2022 | |
| WO | WO 2020086309 | 4/2020 | |

OTHER PUBLICATIONS

Translation of CN 114196388 (Year: 2022).*

Google patents translation of CH 114196388 A (Year: 2022).*

Chu et al., "A facile route towards the preparation of ultra-long-chain amidosulfobetaine surfactants," Synlett, 2009, 16:2655-2658, 4 pages.

Howard et al., "Comparison of Flowback Aids: Understanding Their Capillary Pressure and Wetting Properties," presented at the SPE European Formation Damage Conference, Lafayette, Louisiana, May 27, 2009, 12 pages.

Liang et al., "Identifying and Evaluating Surfactant Additives to Reduce Water Blocks After Hydraulic Fracturing for Low Permeability Reservoirs," presented at the SPE Improved Oil Recovery Conference, Tulsa, Oklahoma, Apr. 11, 2016, 19 pages.

Mahmoudkhani et al., "Microemulsions as Flowback Aids for Enhanced Oil and Gas Recovery After Fracturing, Myth or Reality: A Turnkey Study to Determine the Features and Benefits," presented at the SPE International Symposium on Oilfield Chemistry, Woodlands, Texas, Apr. 13-15, 2015, 21 pages.

Rabie et al., "Evaluation of a New Environmentally Friendly Flowback Surfactant and Its Application to Enhance Oil and Gas Productivity," presented at the SPE Middle East Oil and Gas Show and Conference, Manama, Bahrain, Mar. 18-21, 2019, 15 pages.

Rabie et al., "New Insights in the Characteristics Required for A Successful Flowback Surfactant and Its Use in Tight and Unconventional Reservoirs," presented at the International Petroleum Technology Conference, Beijing, China, Mar. 22, 2019, 16 pages.

Shuler et al., Surfactant Huff-n-Puff Application Potentials for Unconventional Reservoirs, presented at the Improved Oil Recovery Conference, Tulsa, Oklahoma, Apr. 11-13, 2016, 14 pages.

Yue et al., "Multifunctional Fracturing Additives as Flowback Aids" presented at the SPE Annual Technical Conference and Exhibition, Sep. 26-28, 2016, Dubai, UAE, 12 pages.

Zhang et al., "Unique Flow-Back Chemistry for Enhancing Productivity of Low-Permeability Reservoir," presented at the IADC/SPE Asia Pacific Drilling Technology Conference and Exhibition, Tianjin, China, Jul. 9, 2012, 8 pages.

TopSilicone.com [online], "Silicone Adjuvant for Agriculture TPD," retrieved on Jan. 17, 2023, retrieved from URL <https://www.topsilicone.com/product/silicone-agricultual-adjuvant-tpd-348>; 6 pages.

Brown et al., "Stimuli-Responsive Surfactants," Soft Matter, Jan. 23, 2013, 8:2365-74, 11 pages.

Guo et al., "Temperature-Resistant and Salt-Tolerant Mixed Surfactant System for EOR in the Tahe Oilfield," Petroleum Science, Jul. 21, 2020, 18:667-78, 12 pages.

He et al., "Unique Mixtures of Anionic/Cationic Surfactants: A New Approach to Enhance Surfactant Performance in Liquids-Rich Shale Reservoirs," SPE Production & Operations, May 14, 2018, 33(02):363-70, 8 pages.

Jia et al., "Systematic Investigation of the Effects of Mixed Cationic/Anionic Surfactants on the Interfacial Tension of a Water/Model Oil System and their Application to Enhance Crude Oil Recovery," Colloids and Surfaces A: Physicochemical and Engineering Aspects, Sep. 20, 2017, 529:621-7, 7 pages.

Li et al., "Mixtures of Anionic/Cationic Surfactants: A New Approach for Enhanced Oil Recovery in Low-Salinity, High-Temperature Sandstone Reservoir," SPE Journal, Aug. 15, 2016, 21(04):1164-77, 14 pages.

Wazir et al., "New Formulation of Ultra-Low Ift Surfactant for Potential Eor Application," presented at the Offshore Technology Conference Asia, Kuala Lumpur, Malaysia, Mar. 22-25, 2022, 17 pages.

Wu et al., "Study of New Type of Temperature-Resistant and Salt-Tolerant Surfactant for Polymer/Surfactant Two-Component Flooding System," presented at the 2010 Asia-Pacific Power and Energy Engineering Conference, Chengdu, China, Mar. 28, 2010, 4 pages.

Acharya et al., "Effect of temperature on the rheology of wormlike micelles in a mixed surfactant system," Journal of Colloid and Interface Science, Jul. 2007, 315:330-336, 7 pages.

Liu et al., "Comprehensive review on surfactant adsorption on mineral surfaces in chemical enhanced oil recovery," Advances in Colloid and Interface Science, Aug. 2021, 294:102467, 23 pages.

International Search Report and Written Opinion in International Appln No. PCT/US2024/017469, dated May 27, 2024, 18 pages.

International Search Report and Written Opinion in International Appln No. PCT/US2024/037191, dated Oct. 16, 2024, 14 pages.

* cited by examiner

SURFACTANT MIXTURES FOR ENHANCED OIL RECOVERY

TECHNICAL FIELD

This disclosure relates to methods of producing oil using a surfactant blend to assist in enhanced oil recovery.

BACKGROUND

Surfactants are widely used in enhanced oil recovery to aid in displacing fluid and increase the oil recovery for mature fields. The main function of the surfactant is to reduce the interfacial tension (IFT) between crude oil and an injected fluid to ultra-low levels. This increases the capillary number indicating high oil production potential. However, the properties of surfactants are affected by salinity and temperature. Usually, a surfactant-based formulation only fits a narrow range of reservoir conditions in terms of temperature and salinity. Beyond this range, the IFT may increase, lowering oil production. As a result, different surfactant formulations are used for different reservoir conditions to achieve ultra-low IFT to improve oil recovery.

SUMMARY

An embodiment described herein provides a method for enhanced oil recovery using a surfactant blend in an enhanced oil recovery (EOR) fluid. The method includes preparing the surfactant blend in a base fluid, by adding a first surfactant including a anionic-nonionic surfactant selected from sodium alkylphenol ethoxylate carboxylate (APEC), sodium alkyl ethoxylate carboxylate (AEC), sodium alkylphenol ethoxylate sulfate (APES), or sodium alkyl ethoxylate sulfate (AES), to the base fluid, and adding a second surfactant including a cationic surfactant including an alkyl pyridine salt to the base fluid forming the EOR fluid. The EOR fluid is injected into a reservoir through an injection well. Fluid is pushed to a production well. Fluid is produced from the production well, wherein the produced fluid includes hydrocarbons.

Another embodiment described herein provides an enhanced oil recovery (EOR) fluid. The EOR fluid includes a base fluid, an anionic-nonionic surfactant including one of sodium alkylphenol ethoxylate carboxylate (APEC), sodium alkyl ethoxy late carboxylate (AEC), sodium alkylphenol ethoxylate sulfate (APES), or sodium alkyl ethoxylate sulfate (AES), to the base fluid, and a second surfactant including a cationic surfactant including an alkyl pyridine salt.

DETAILED DESCRIPTION

This invention provides surfactant mixtures composed of anionic-nonionic surfactant and cationic surfactant for chemical enhanced oil recovery in reservoirs with a wide range of temperatures and salinities. The anionic-nonionic surfactant contains both anionic and nonionic groups in one molecule. Usually, different reservoir conditions require different surfactant formulations to achieve ultra-low oil/water interfacial tension (IFT) to mobilize the residual oil since surfactant properties are affected by the reservoir condition such as salinity and temperature.

The surfactant formulations provided herein examples herein have low IFT of $10^{-2}$ to $10^{-3}$ mN/m under different conditions with different salinities and temperatures. Thus, these surfactant mixtures could be used in reservoirs with different conditions. The IFT of the anionic-nonionic surfactant or the cationic surfactant showed a high IFT, for example, greater than about 0.4 milliNewtons per meter. The low IFT of the mixture of these two surfactants is due to the synergism between oppositely charged anionic and cationic head groups, which leads to a close packing adsorption layer on the interface. The surfactant mixtures present a significant improvement in oil recovery for reservoirs with different temperatures and salinities due to the increase in ultra-low IFT.

Figure 1:
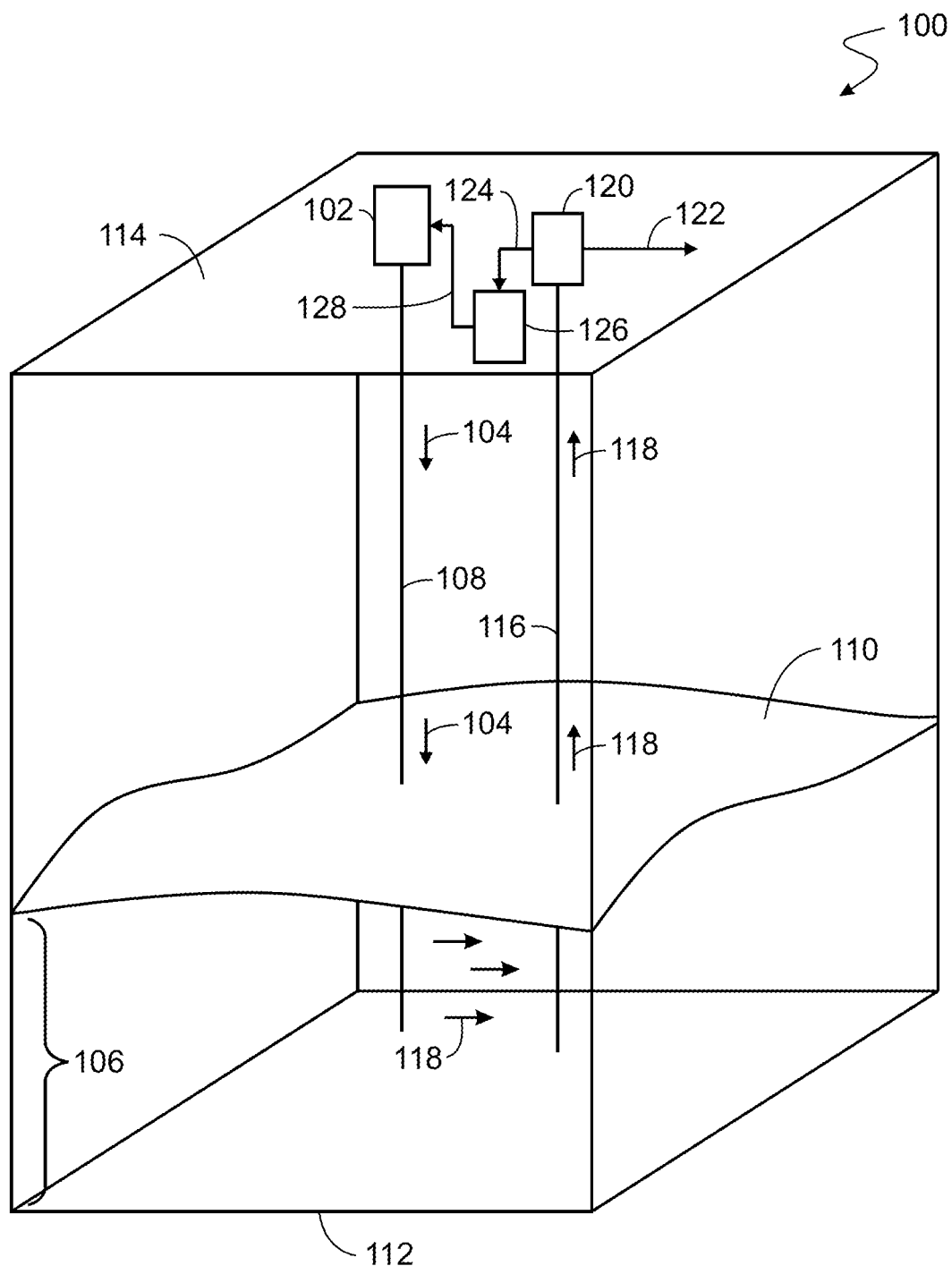
FIG. 1 is a drawing of an enhanced oil recovery (EOR) process 100.

FIG. 1 is a drawing of an enhanced oil recovery (EOR) process 100. In the EOR process 100, a mixing system 102 is used to mix the base fluid with a surfactant blend. The mixing system 102 can include pumps, tanks, valves, and other equipment to make the mixture. In various embodiments, the mixing system 102 includes storage tanks for the base fluid, the first surfactant, and the second surfactant. Pumps are then used to add the base fluid, a first surfactant, and the second surfactant to a mixing tank forming the EOR fluid 104.

A pump injects the EOR fluid 104 into a reservoir 106 through an injection well 108. For example, the reservoir 106 can be formed by a cap rock layer 110 trapping hydrocarbons over an aquifer 112, among others. Early in the production from the reservoir 106, the pressure in the reservoir 106 may be sufficient to force the hydrocarbons to the surface 114 through a production well 116. However, over time the pressure in the reservoir 106 will decrease, decreasing the production from the reservoir 106.

In the EOR process 100, the EOR fluid 104 forces fluids 118 to the production well 116. The fluids 118 are then produced to the surface 114 through the production well 116. The fluids 118 may include mixtures of hydrocarbons with entrained water, termed a water cut. The ratio of hydrocarbons to water may be about 100/0, about 90/10, about 70/30, or about 60/40, or lower.

At the surface 114, the fluids 118 are processed in a separation system 120, such as a water oil separation plant (WOSP), a water gas separation plant (WGSP), or a combined plant, forming a hydrocarbon stream 122. The hydrocarbon stream 122 is then sent for further processing, for example, being pumped through a pipeline to a refinery or gas plant.

A water stream 124 from the separation system 120 can be provided to a purification system 126, which can separate out any remaining hydrocarbons, and determine the concentration of the remaining surfactants. The purification system 126 can include analyzers, pumps, tanks, and the like. Hydrocarbons separated out by the purification system 126 can be returned to the separation system 120 to be combined with the hydrocarbon stream 122.

A base fluid stream 128 can be provided from the purification system 126 to the mixing system 102. The base fluid stream 128 can provide at least a portion of the base fluid used for preparing the EOR fluid 104.

Figure 2:
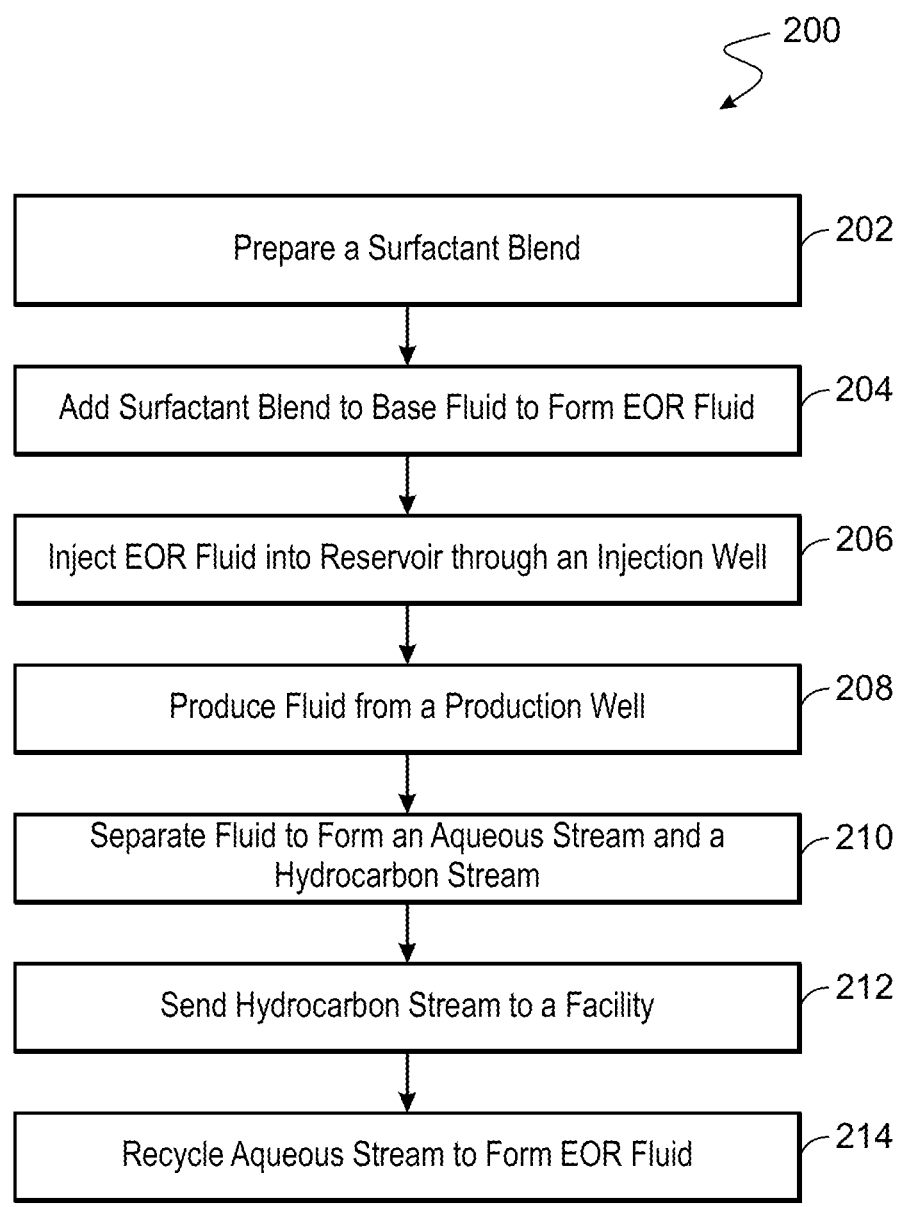
FIG. 2 is a process flow diagram of a method 200 for using a surfactant mixture in enhanced oil recovery.

FIG. 2 is a process flow diagram of a method 200 for using a surfactant mixture in enhanced oil recovery. The method begins at block 202 with the preparation of the surfactant blend. In some embodiments, the surfactant blend is made directly in the base fluid, either before or after adding additional ingredients, forming the EOR fluid.

As described herein, the surfactant blend includes two types of surfactants, anionic-nonionic surfactants and cationic surfactants. The anionic-nonionic surfactants include sodium alkylphenol ethoxylate carboxylate (APEC), sodium alkyl ethoxylate carboxylate (AEC), sodium alkylphenol ethoxylate sulfate (APES) and sodium alkyl ethoxylate sulfate (AES). The nonionic group in the anionic surfactant could be ethylene oxide chains, propylene oxide chains, or a mixture of them. The cationic surfactant is an alkyl pyridine salt, such as dodecyl pyridine bromide (DPB), cetylpridinium bromide (CPB), and the like.

In some embodiments, the base fluid is an aqueous fluid, such as a brine. In various embodiments, the salinity of the brine is in a range of about 1000 ppm to about 100,000 ppm, or about 10,000 ppm to about 90,000 ppm, or about 14,000 ppm to about 87,000 ppm, or about 14,420 ppm to about 86,505 ppm. In some embodiments, the salinity is about 10,000 ppm, about 14,420 ppm, about 14,500 ppm, about 20,000 ppm, or about 57,000 ppm, about 57,670 ppm, or about 86,505 ppm. The hardness of the base fluid may range from about 50 ppm to about 5000 ppm, or about 1000 ppm to about 4000 ppm, or about 2000 ppm to about 3000 ppm. In some embodiments, the hardness of the base fluid is about 500 ppm, or about 2000 ppm, or about 2500 ppm, or about 2760 ppm.

In embodiments described herein, the anionic-nonionic surfactant is in a blend with the cationic surfactant, which provides better solubility than the anionic-nonionic surfactant alone in brine or water, while maintaining a low surface tension. The mixing ratio of the anionic-nonionic surfactant and the cationic surfactant is between about 9:1 to 1:9. In various embodiments, the mixing ratio is about 9:1, or about 3:1, or about 2:1, or about 2:3, or about 1 to 1, or about 1:2, or about 1:3, or about 1:4, or about 1:9. The total concentration of the surfactant blend in the base fluid varies from about 0.01 wt. % to about 1 wt. %. In various embodiments, the total concentration of the surfactant blend is about 0.01 wt. %, about 0.05 wt. %, about 0.1 wt. %, about 0.3 wt. %, about 0.5 wt. %, about 0.75 wt. %, or about 1.0 wt. %. In various embodiments, the total concentration of the surfactant blend is 0.2 wt. %.

The surfactant blend can be used in a temperature range from about 15° C. to about 100° C., from about 40° C. to about 95° C., or from about 50° C. to about 90° C. In various embodiments, the formulation is used at a temperature of about 90° C.

If the surfactant blend has not been prepared in the base fluid, at block 204, the surfactant blend is added to the base fluid to form the EOR fluid. Additional production chemicals may be added to the EOR fluid to assist in the process. These may be added to the EOR fluid before or after the addition of the surfactants. The base fluid can be water, brine, or an emulsion of oil and brine, for example, including some amount of oil in a recycled water stream from a water oil separation plant. In various embodiments, the amount of oil is less than about 5 vol. %, less than about 2.5 vol. %, less than about 1 vol. %, less than about 0.5 vol. %, less than about 0.1 vol. %, or less than about 1000 ppm. The production chemicals can include a viscosifier, a biocide, an acid, a pH buffer, or any combinations thereof. In some embodiments, the viscosifier is a polysaccharide, such as guar gum, hydroxymethyl cellulose, and the like.

At block 206, the EOR fluid is injected into a reservoir through an injection well. In various embodiments, multiple injection wells are used. The injection of the EOR fluid forces fluid proximate to the injection well through the reservoir towards a production well.

At block 208, fluid is produced from a production well. The fluid can include hydrocarbons, such as oil or gas, and aqueous fluids, such as the EOR fluid, brine from a water cut, and the like. At block 210, the fluid is separated to form an aqueous stream and a hydrocarbon stream. The separation is generally performed in a water oil separation plant (WOSP), a water gas separation plant (WGSP), or a combined facility that separates both oil and gas from the entrained water.

At block 212, the hydrocarbon stream is sent to a facility for further processing. For example, the facility may be a refinery, a gas plant, and the like.

At block 214, the aqueous stream is recycled as a portion of the base fluid for forming the EOR fluid. If more base fluid is needed amount for making the EOR fluid, additional brine or fluid may be added, such as seawater, if proximate to the ocean. A further water hydrocarbon separation system may be used if needed to lower the amount of oil or gas entrained in the aqueous stream. The amount of surfactants in the aqueous stream can be tested, and additional surfactants added to bring the concentration up to the use concentration, for example, of about 0.2 wt. % at a ratio of 3/1 of the anionic-nonionic surfactant to the cationic surfactant.

Examples

Surfactant solutions were prepared and placed at 25° C. and 95° C. for 1 day. The appearance of surfactant solutions in brines was observed visually to determine the compatibility. The compatibility results were recorded by the compatibility codes of A: clear solution: B: slightly hazy solution: C: hazy solution; and D: precipitation. IFT between surfactant solution and crude oil was measured by spinning drop tensiometer SDT (KRUSS) with video camera at different temperatures. The rotation speed used was 5000 rpm. Vonnegut formula was used to calculate IFT when the ratio of the drop length to the drop diameter was larger than 4.0, otherwise Laplace-Young formula was used.

The anionic surfactant used for the tests is sodium alkylphenol ethoxylate carboxylate (APEC). APEC was provided by Sinopec Shanghai Research Institute of Petroleum Technology with active content of 50 wt. %. The cationic surfactant is cetylpridinium bromide (CPB). CPB is purchased from Sinopharm Chemical Reagent Co., Ltd with CP grade. The interfacial surface tension (IFT) is measured using a spinning drop tensiometer (SDT), equipped with a video camera from KRÜSS GmbH of Hamburg, Germany. The oil drop was injected into a glass tube filled with surfactant solution using a 10 μL syringe. The tube containing surfactant solution and oil drop was placed in the instrument and accelerated to a constant rotation speed. The shape of oil drop was recorded to calculate IFT. The rotation speed mainly used was 5,000 rpm. Vonnegut formula was used to calculate IFT when the ratio of the drop length to the drop diameter was greater than 4.0, otherwise Laplace-Young formula was used. The data was automatically recorded by the software.

Seawater was used for all tests. The seawater had a salinity of 57,670 ppm and a hardness of 2,760 ppm. As used herein, the hardness is generally a measurement of calcium and magnesium and does not include the counter ion. The compatibility of APEC in the seawater at 90° C. was poor. Two layers were observed and the solution became hazy after shaking. This indicates that the cloud point of APEC is not sufficient for use in a high temperature reservoir. However, mixing with CPB improved the compatibility, as shown by the solution becoming homogeneous and opalescence.

Testing Surfactant Blend at Different Mixing Ratios

Figure 3:
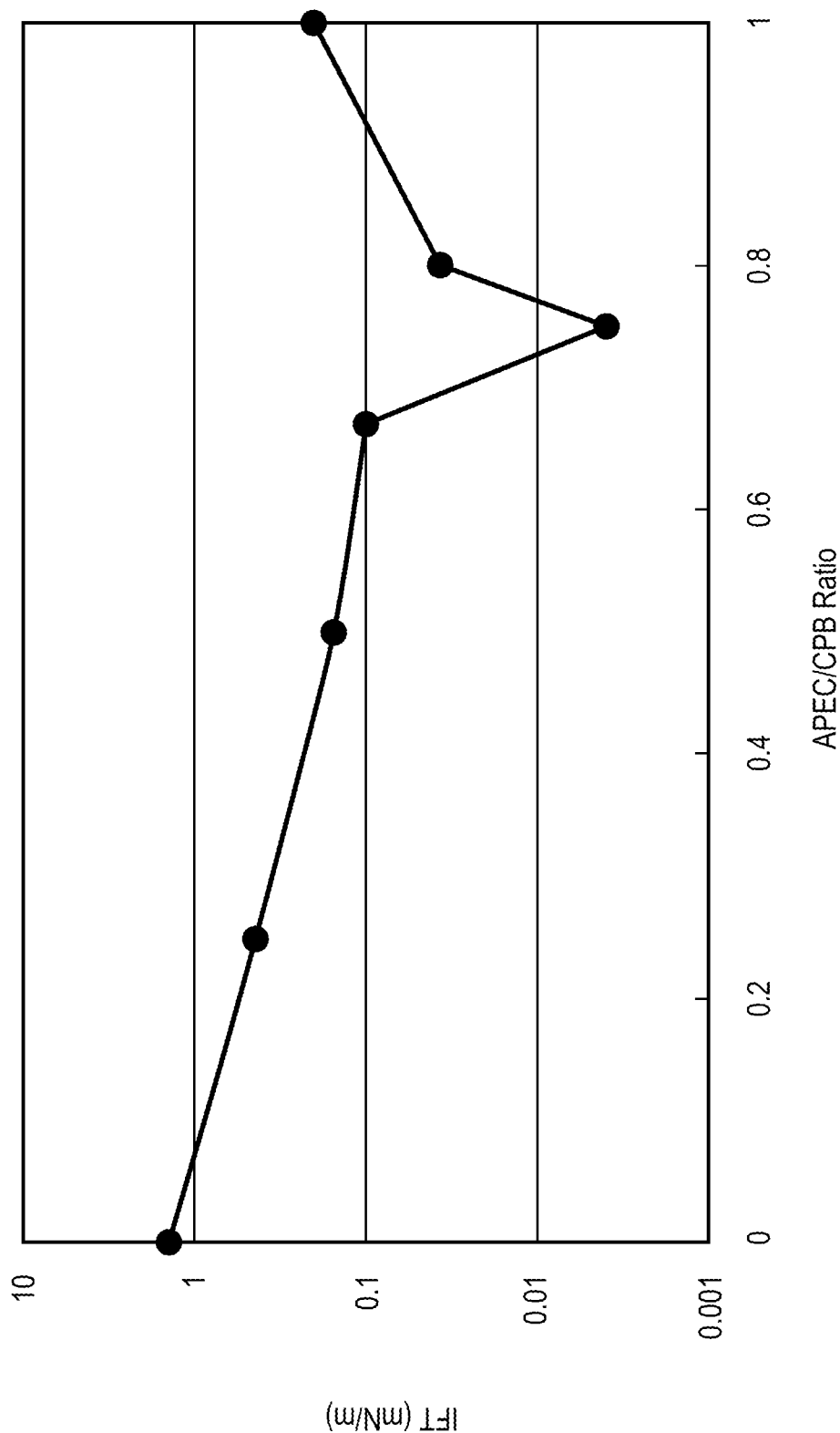
FIG. 3 is a plot of the IFT of 0.2% APEC/CPB at 90° C. in seawater at different mixing ratios.

FIG. 3 is a plot of the IFT of 0.2 wt. % APEC/CPB at 90° C. in seawater at different mixing ratios. As shown in FIG. 3, the IFT of a 0.2% APEC solution and seawater was 1.4 mN/m. The IFT of a 0.2% CPB solution in seawater is 0.2 mN/m. The IFT values of the 100% solutions of both APEC and CPB are too high for enhanced oil recovery.

A lower IFT was obtained by mixing APEC with CPB. The IFT of the APEC/CPB mixtures decreased at first, and then increased with the mixing ratio. The lowest IFT of the APEC/CPB mixtures was 4.0×10−3 mN/m at a mixing ratio of about 3/1. This very low IFT value indicates good potential for improving oil recovery.

The IFT of mixture was much lower than the IFT of the individual surfactants, due to the synergism between anionic-nonionic and cationic surfactants. Further, as noted above, the addition of the cationic surfactant to the solution of the anionic-nonionic surfactant improved the compatibility, as shown by a reduction in haze at 90° C.

Testing Surfactant Mixtures at Different Salinities Over a Temperature Range

Figure 4:
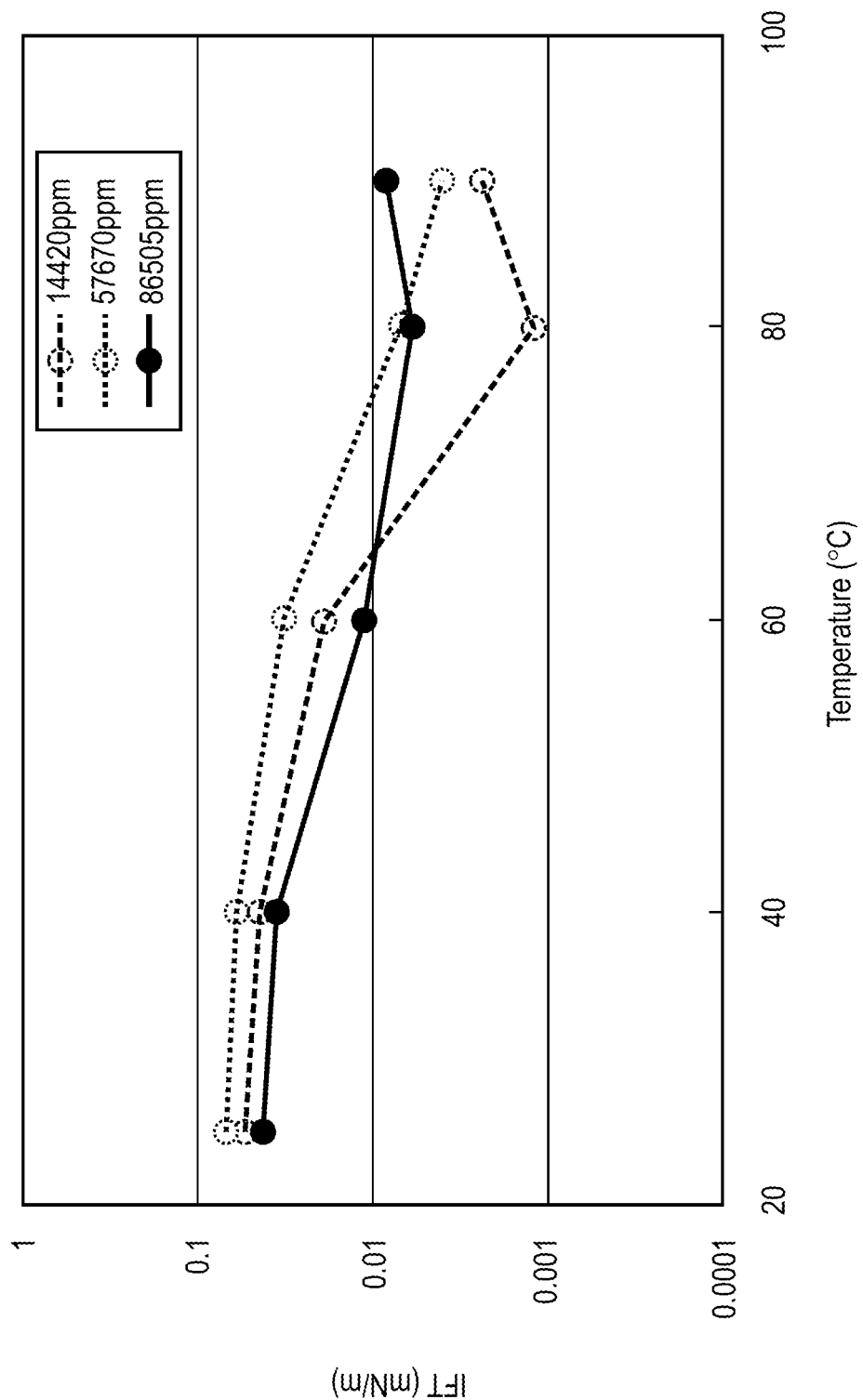
FIG. 4 is a plot of the IFT of a 0.2% APEC/CPB mixture in the base fluid at a 3/1 ratio of APEC/CPB versus temperatures in brines with different salinities.

FIG. 4 is a plot of the IFT of a 0.2% APEC/CPB mixture in the base fluid at a 3/1 ratio of APEC/CPB versus temperatures in brines with different salinities. The surfactant blends showed low oil/water IFT in brines with different salinities at different temperatures.

The solution of 0.2% APEC/CPB maintained a low IFT of $10^{-2}$ to $10^{-3}$ mN/m in seawater (57,670 ppm) in a wide temperature range from 25 to 90° C., as shown in FIG. 2 and Table 2. At a temperature of 80° C., the IFT was $10^{-3}$ mN/m. This indicates that this formulation could be used in reservoirs at high temperature.

The surfactant mixtures have good compatibility, as shown in Table 1, and low IFT of $10^{-2}$ to $10^{-3}$ mN/m under different conditions with different salinities and temperatures, as shown in FIG. 4 and Table 2. The temperature range tested is from 25 to 90° C. and the salinity range is from 14420 ppm to 86505 ppm.

TABLE 1

Compatibility of 0.2% APEC/CPB mixtures with different mixing ratios in seawater.

| $m_{APEC}/m_{CPB}$ | 0/1 | 1/3 | 1/1 | 2/1 | 3/1 | 4/1 | 1/0 |
|---|---|---|---|---|---|---|---|
| 25° C. | A | A | A | A | A | A | A |
| 95° C. | A | A | A | B | B | B | C |

Note:
A: clear solution;
B: slightly hazy solution;
C: hazy solution; and
D: precipitation In addition to the favorable results in seawater, the 0.2% APEC/CPB solution maintained a low IFT of $10^{-2}$ to $10^{-3}$ mN/m in brines with a lower salinity of 14,400 ppm and also higher salinity of 86,505 ppm in a wide temperature range from 25 to 90° C. (FIG. 2 and Table 2). These results indicate that this surfactant blend is tolerant of both temperature and salinity variations in reservoirs.

TABLE 2

IFT data of 0.2% APEC/CPB = 3/1 in brines with different salinities at different temperatures.

| | IFT/mN/m | | |
|---|---|---|---|
| Temperature (° C.) | 0.25 × seawater (14420 ppm) | seawater (57670 ppm) | 1.5 × seawater (86505 ppm) |
| 25 | 0.054 | 0.067 | 0.044 |
| 40 | 0.045 | 0.060 | 0.037 |
| 60 | 0.019 | 0.032 | 0.011 |
| 80 | $1.2 \times 10^{-3}$ | $6.8 \times 10^{-3}$ | $5.9 \times 10^{-3}$ |
| 90 | $2.4 \times 10^{-3}$ | $4.0 \times 10^{-3}$ | $8.4 \times 10^{-3}$ |

Embodiments

An embodiment described herein provides a method for enhanced oil recovery using a surfactant blend in an enhanced oil recovery (EOR) fluid. The method includes preparing the surfactant blend in a base fluid, by adding a first surfactant including a anionic-nonionic surfactant selected from sodium alkylphenol ethoxylate carboxylate (APEC), sodium alkyl ethoxylate carboxylate (AEC), sodium alkylphenol ethoxylate sulfate (APES), or sodium alkyl ethoxylate sulfate (AES), to the base fluid, and adding a second surfactant including a cationic surfactant including an alkyl pyridine salt to the base fluid forming the EOR fluid. The EOR fluid is injected into a reservoir through an injection well. Fluid is pushed to a production well. Fluid is produced from the production well, wherein the produced fluid includes hydrocarbons.

In an aspect, combinable with any other aspect, the first surfactant includes APEC.

In an aspect, combinable with any other aspect, the second surfactant includes cetylpyridinium bromide.

In an aspect, combinable with any other aspect, the method includes forming a 0.2 weight percent mixture of the surfactants in the base fluid.

In an aspect, combinable with any other aspect, the method includes adding the first surfactant to the base fluid in a 3:1 mass ratio to the second surfactant.

In an aspect, combinable with any other aspect, the interfacial tension (IFT) of the EOR fluid is about $4.0 \times 10^{-3}$ milliNewtons per meter (mN/m) at 90° C.

In an aspect, combinable with any other aspect, the IFT of the EOR fluid is between about $10^{-2}$ and about $10^{-3}$ mN/m in a solution of about 58,000 ppm salinity had a temperature between about 25° C. and about 90° C.

In an aspect, combinable with any other aspect, the IFT of the EOR fluid is about $10^{-3}$ at about 80° C.

In an aspect, combinable with any other aspect, the method includes separating the produced fluid to form an aqueous stream and a hydrocarbon stream.

In an aspect, combinable with any other aspect, the method includes sending the hydrocarbon stream to a facility.

In an aspect, combinable with any other aspect, the method includes recycling the aqueous stream to form the EOR fluid.

In an aspect, combinable with any other aspect, the method includes separating oil from the aqueous stream to form at least a portion of the base fluid.

In an aspect, combinable with any other aspect, the method includes adding a makeup stream of base fluid to the aqueous stream.

In an aspect, combinable with any other aspect, the method includes incorporating production chemicals into the EOR fluid, wherein the production chemicals include a biocide, a pH buffer, an acid, or a chelating agent, or any combinations thereof.

In an aspect, combinable with any other aspect, the base fluid includes a brine.

Another embodiment described herein provides an enhanced oil recovery (EOR) fluid. The EOR fluid includes a base fluid, an anionic-nonionic surfactant including one of sodium alkylphenol ethoxylate carboxylate (APEC), sodium alkyl ethoxylate carboxylate (AEC), sodium alkylphenol ethoxylate sulfate (APES), or sodium alkyl ethoxylate sulfate (AES), and a second surfactant including a cationic surfactant including an alkyl pyridine salt.

In an aspect, combinable with any other aspect, the first surfactant includes APEC.

In an aspect, combinable with any other aspect, the second surfactant includes cetylpyridinium bromide.

In an aspect, combinable with any other aspect, the EOR fluid includes a 0.2 weight percent mixture of the surfactants in the base fluid.

In an aspect, combinable with any other aspect, the EOR fluid includes a 3:1 mass ratio of the first surfactant to the second surfactant.

In an aspect, combinable with any other aspect, the interfacial tension (IFT) of the EOR fluid is about $4.0 \times 10^{-3}$ millinewtons per meter (mN/m) at 90° C.

In an aspect, combinable with any other aspect, the IFT of the EOR fluid is between about $10^{-2}$ and about $10^{-3}$ mN/m in a solution of about 58,000 ppm salinity at a temperature between about 25° C. and about 90° C.

In an aspect, combinable with any other aspect, the IFT of the EOR fluid is about $10^{-3}$ at about 80° C.

Other implementations are also within the scope of the following claims.

What is claimed is:

1. An enhanced oil recovery (EOR) fluid, comprising:
   a base fluid comprising a high salinity brine wherein the brine has a salinity in a range of about 14,000 ppm to about 87,000 ppm;
   a first surfactant comprising an anionic-nonionic surfactant selected from the group consisting of sodium alkylphenol ethoxylate carboxylate (APEC), sodium alkyl ethoxylate carboxylate (AEC), sodium alkylphenol ethoxylate sulfate (APES), and sodium alkyl ethoxylate sulfate (AES); and
   a second surfactant comprising a cationic surfactant comprising an alkyl pyridine salt;
   wherein the EOR fluid has a temperature between about 80° C. and about 90° C.; and
   wherein the base fluid comprises a 0.2 weight percent mixture of the first surfactant and the second surfactant in the base fluid.

2. The EOR fluid of claim 1, wherein the first surfactant comprises APEC.

3. The EOR fluid of claim 1, wherein the second surfactant comprises cetylpyridinium bromide.

4. The EOR fluid of claim 1, comprising a 3:1 mass ratio of the first surfactant to the second surfactant.

5. The EOR fluid of claim 4, wherein the interfacial tension (IFT) of the EOR fluid is about $4.0 \times 10^{-3}$ millinewtons per meter (mN/m) at 90° C.

6. The EOR fluid of claim 4, wherein the IFT of the EOR fluid is between about $10^{-2}$ to about $10^{-3}$ mN/m in a solution of about 58,000 ppm salinity at a temperature between about 80° C. to about 90° C.

7. The EOR fluid of claim 4, wherein the IFT of the EOR fluid is about $10^{-3}$ at about 80° C.

8. The EOR fluid of claim 1, wherein the brine has a hardness of about 50 ppm to about 5,000 ppm.

9. A method for enhanced oil recovery, comprising:
   preparing the EOR fluid of claim 1 by:
   adding the first surfactant to the base fluid; and
   adding the second surfactant to the base fluid forming the EOR fluid;
   injecting the EOR fluid into a reservoir through an injection well;
   pushing fluid to a production well; and
   producing fluid from the production well, wherein the produced fluid comprises hydrocarbons.

10. The method of claim 9, wherein the first surfactant comprises APEC.

11. The method of claim 9, wherein the second surfactant comprises cetylpyridinium bromide.

12. The method of claim 9, comprising adding the first surfactant to the base fluid in a 3:1 mass ratio to the second surfactant.

13. The method of claim 12, wherein the interfacial tension (IFT) of the EOR fluid is about $4.0 \times 10^{-3}$ milliNewtons per meter (mN/m) at 90° C.

14. The method of claim 12, wherein the IFT of the EOR fluid is between about $10^{-2}$ to about $10^{-3}$ mN/m in a solution of about 58,000 ppm salinity at a temperature between about 80° C. to about 90° C.

15. The method of claim 12, wherein the IFT of the EOR fluid is about $10^{-3}$ at about 80° C.

16. The method of claim 9, comprising separating the produced fluid to form an aqueous stream and a hydrocarbon stream.

17. The method of claim 16, comprising sending the hydrocarbon stream to a facility.

18. The method of claim 16, comprising recycling the aqueous stream to form the EOR fluid.

19. The method of claim 18, comprising separating oil from the aqueous stream to form at least a portion of the base fluid.

20. The method of claim 19, comprising adding a makeup stream of base fluid to the aqueous stream.

21. The method of claim 9, comprising incorporating production chemicals into the EOR fluid, wherein the production chemicals comprise a biocide, a pH buffer, an acid, or a chelating agent, or any combinations thereof.

* * * * *